US011006133B2

(12) United States Patent
Keinert et al.

(10) Patent No.: US 11,006,133 B2
(45) Date of Patent: May 11, 2021

(54) IMAGE COMPRESSION TECHNIQUE

(71) Applicant: Fraunhofer-Gesellschaft zur Foerderung der angewandten Forschung e.V., Munich (DE)

(72) Inventors: Joachim Keinert, Erlangen (DE); Thomas Richter, Erlangen (DE); Herbert Thoma, Erlangen (DE); Christian Scherl, Erlangen (DE); Manuel De Frutos López, Erlangen (DE); Siegfried Foessel, Erlangen (DE); Wolfgang Heppner, Erlangen (DE); Miguel Ángel Martínez Del Amor, Erlangen (DE); Sergej Wtjurin, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 16/360,557

(22) Filed: Mar. 21, 2019

(65) Prior Publication Data
US 2019/0222854 A1    Jul. 18, 2019

Related U.S. Application Data

(63) Continuation of application No. PCT/EP2017/067877, filed on Jul. 14, 2017.

(30) Foreign Application Priority Data

Sep. 23, 2016    (EP) .................................... 16190473

(51) Int. Cl.
*H04N 19/129*    (2014.01)
*H04N 19/182*    (2014.01)
(Continued)

(52) U.S. Cl.
CPC ......... *H04N 19/186* (2014.11); *H04N 19/105* (2014.11); *H04N 19/129* (2014.11);
(Continued)

(58) Field of Classification Search
CPC .......................... H04N 19/129; H04N 19/182
(Continued)

(56) References Cited

U.S. PATENT DOCUMENTS 5,764,804 A * 6/1998 Yajima .................... G06T 9/004
                                                     348/27
2002/0080153 A1    6/2002 Zhao et al.
(Continued)

FOREIGN PATENT DOCUMENTS

WO    2015091879 A2    6/2015

OTHER PUBLICATIONS

Joshi, Rajan et al., "Screen Content Coding Test Model 7 Encoder Description (SCM 7)", 23. JCT-VC Meeting; Feb. 6, 2016-Feb. 26, 2016; San Diego; (Joint Collaborative Team on Video Coding of ISO/IEC JTC1/SC29/WG11 and ITU-T SG.16 ); URL: HTTP://WFTP3.ITU.INT/AV-ARCH/JCTVC-SITE/; No. JCTVCWI014, May 23, 2016 (May 23, 2016), XP030117933, May 23, 2016, pp. 1-14.
(Continued)

*Primary Examiner* — Jeffery A Williams
(74) *Attorney, Agent, or Firm* — Perkins Coie LLP; Michael A. Glenn

(57) ABSTRACT

Concepts are presented herein how to efficiently create a suitable palette for low complexity image and video coding. A combination of the palette coding with transform coding is feasible.

26 Claims, 4 Drawing Sheets

(51) Int. Cl.
    *H04N 19/186*     (2014.01)
    *H04N 19/105*     (2014.01)
    *H04N 19/176*     (2014.01)
    *H04N 19/593*     (2014.01)
    *H04N 19/94*     (2014.01)

(52) U.S. Cl.
    CPC ......... *H04N 19/176* (2014.11); *H04N 19/182* (2014.11); *H04N 19/593* (2014.11); *H04N 19/94* (2014.11)

(58) Field of Classification Search
    USPC .................................................. 375/240.21
    See application file for complete search history.

(56) References Cited

U.S. PATENT DOCUMENTS

2015/0281703 A1    10/2015   Zou et al.
2017/0054990 A1*   2/2017   Itoh ...................... H04N 19/593

OTHER PUBLICATIONS

Zhan, Ma et al., "Advanced Screen Content Coding Using Color Table and Index", IEEE Transactions on Image Processing, IEEE Service Center, Piscataway, NJ, US, vol. 23, No. 10, Oct. 1, 2014, pp. 4399-4412, XP011558255, Oct. 1, 2014, pp. 4399-4412.

* cited by examiner

IMAGE COMPRESSION TECHNIQUE

CROSS-REFERENCES TO RELATED APPLICATIONS

This application is a continuation of copending International Application No. PCT/EP2017/067877, filed Jul. 14, 2017, which is incorporated herein by reference in its entirety, and additionally claims priority from European Application No. EP 16 190 473.5, filed Sep. 23, 2016, which is incorporated herein by reference in its entirety.

The present application relates to the field of image compression and, more specifically to a compression technique with low complexity.

BACKGROUND OF THE INVENTION

As the size of raw images tends to increase continuously over the last years, it may be useful to provide more efficient data compression techniques in order to allow the storage and transmission of these images. For example, it is today commonplace to download and view images on mobile equipment where data compression is relevant to save bandwidth and local storage.

Compression of images is known in the field, where the compression can be either lossy, e.g., in the case of JPEG images or can be lossless, e.g., for GIF pictures. Compression of an image or a video sequence typically consists of a frequency transform followed by quantization and coding.

Compression of an image or a video sequence typically consists of a frequency transform, followed by quantization and entropy coding. However, transform coding does not perform well for some image content, especially for screen content. Such content typically features only few distinct colors and sharp edges between differently colored regions, e.g. black text on white background. Such content can be efficiently compressed using a list of the distinct colors, called a palette, and indices into this palette per pixel.

Palette coding is a well-known technique for image coding. An early use of palettes was indexed image formats like the graphics interchange format, better known as GIF format. The GIF format uses one palette for the entire image with up to 256 distinct colors. The palette indexes can be compressed using run length coding.

The HEVC standard, also known as H.265, introduces a palette mode with the screen coding extensions. In the HEVC palette mode a palette is transmitted per coding unit, CU. The palette entries for a CU can be predicted from neighboring CUs. Palette indices are run length coded and multiple scan patterns are possible. Escape coding can be used to encode single pixels that are not well represented by the palette entries. Finally all syntax elements are entropy coded using context-adaptive binary arithmetic coding, CABAC.

Nevertheless, the known techniques are complex, having certain memory and CPU requirements what makes it difficult to implement these for mobile devices which in most cases have limited resources, e.g. regarding battery or CPU power.

SUMMARY

According to an embodiment, an encoder configured to encode a pixel array by palette coding may be configured to: traverse pixels of a predetermined region of the pixel array along a scan order with, if the currently traversed pixel's color value does not fulfill a predetermined similarity criterion with respect to any of a sequence of palette color values currently included in the color palette, update the color palette by appending the currently traversed pixel's color value to an end of the sequence of palette color values, corresponding to a lowest rank of the color palette, and, if the currently traversed pixel's color value fulfills the predetermined similarity criterion with respect to at least one of the sequence of palette color values currently included in the color palette, increase a rank of the palette color value of highest rank among the at least one of the sequence of palette color values currently included in the color palette by one; and code into a data stream: a color palette information on the color palette; an information associating each pixel with a respective palette color value of the color palette.

According to another embodiment, an encoding method for encoding a pixel array by palette coding may have the steps of: traversing pixels of a predetermined region of the pixel array along a scan order with, if the currently traversed pixel's color value does not fulfill a predetermined similarity criterion with respect to any of a sequence of palette color values currently included in the color palette, updating the color palette by appending the currently traversed pixel's color value to an end of the sequence of palette color values, corresponding to a lowest rank of the color palette, and, if the currently traversed pixel's color value fulfills the predetermined similarity criterion with respect to at least one of the sequence of palette color values currently included in the color palette, increasing a rank of the palette color value of highest rank among the at least one of the sequence of palette color values currently included in the color palette by one; and coding into a data stream: a color palette information on the color palette; an information associating each pixel with a respective palette color value of the color palette.

According to another embodiment, an encoder configured to encode a pixel array by palette coding may be configured to: traverse pixels of a predetermined region of the pixel array along a scan order with, if the currently traversed pixel's color value does not fulfill a predetermined similarity criterion with respect to any of a sequence of palette color values currently included in the color palette, update the color palette by appending the currently traversed pixel's color value to an end of the sequence of palette color values, corresponding to a lowest rank of the color palette, and, if the currently traversed pixel's color value fulfills the predetermined similarity criterion with respect to at least one of the sequence of palette color values currently included in the color palette, perform an adaptation of a rank order among the palette color values currently included in the color palette depending on with which of the sequence of palette color values currently included in the color palette the currently traversed pixel the currently traversed pixel's color value fulfills a predetermined similarity criterion; code into a data stream: a color palette information on the color palette; an information associating each pixel with a respective palette color value of the color palette, wherein the encoder is configured such that the currently traversed pixel's color value fulfills the predetermined similarity criterion with respect to a predetermined palette color value among the sequence of palette color values currently included in the color palette if a difference between the currently traversed pixel's color value and predetermined palette color succeeds a predetermined threshold wherein the threshold depends on a rank of the predetermined palette color value within the sequence of palette color values.

According to another embodiment, an encoding method for encoding a pixel array by palette coding may have the steps of: traversing pixels of a predetermined region of the pixel array along a scan order with, if the currently traversed pixel's color value does not fulfill a predetermined similarity criterion with respect to any of a sequence of palette color values currently included in the color palette, updating the color palette by appending the currently traversed pixel's color value to an end of the sequence of palette color values, corresponding to a lowest rank of the color palette, and, if the currently traversed pixel's color value fulfills a predetermined similarity criterion with respect to at least one of the sequence of palette color values currently included in the color palette, performing an adaptation of a rank order among the palette color values currently included in the color palette depending on with which of the sequence of palette color values currently included in the color palette the currently traversed pixel the currently traversed pixel's color value fulfills a predetermined similarity criterion; coding into a data stream: a color palette information on the color palette; an information associating each pixel with a respective palette color value of the color palette, wherein the currently traversed pixel's color value fulfills the predetermined similarity criterion with respect to a predetermined palette color value among the sequence of palette color values currently included in the color palette if a difference between the currently traversed pixel's color value and predetermined palette color succeeds a predetermined threshold wherein the threshold depends on a rank of the predetermined palette color value within the sequence of palette color values.

According to another embodiment, an encoder configured to encode a pixel array by palette coding may be configured to: traverse pixels of a predetermined region of the pixel array along a scan order with, if the currently traversed pixel's color value does not fulfill a predetermined similarity criterion with respect to any of a sequence of palette color values currently included in the color palette, update the color palette by appending the currently traversed pixel's color value to an end of the sequence of palette color values, corresponding to a lowest rank of the color palette, and, code into a data stream: a color palette information on the color palette; an information associating each pixel with a respective palette color value of the color palette, wherein the encoder is configured to adapt a rank order among the palette color values currently included in the color palette while traversing the pixels, and/or limit a number of the palette color values in the color palette, and the scan order sequentializes the pixels in a manner so that more than a quarter of in scan order immediately consecutive pairs of pixels include pixel borders distanced from another by at least an inner of another pixel.

According to another embodiment, an encoding method for encoding a pixel array by palette coding may have the steps of: traversing pixels of a predetermined region of the pixel array along a scan order with, if the currently traversed pixel's color value does not fulfill a predetermined similarity criterion with respect to any of a sequence of palette color values currently included in the color palette, updating the color palette by appending the currently traversed pixel's color value to an end of the sequence of palette color values, corresponding to a lowest rank of the color palette, and adapting a rank order among the palette color values currently included in the color palette while traversing the pixels, and/or limiting a number of the palette color values in the color palette, coding into a data stream: a color palette information on the color palette; an information associating each pixel with a respective palette color value of the color palette, wherein the scan order sequentializes the pixels in a manner so that more than a quarter of in scan order immediately consecutive pairs of pixels include pixel borders distanced from another by at least an inner of another pixel.

According to another embodiment, an encoder configured to encode a pixel array by palette coding may be configured to: traverse pixels of a predetermined region of the pixel array along a first scan order with, if the currently traversed pixel's color value does not fulfill a predetermined similarity criterion with respect to any of a sequence of palette color values currently included in the color palette, update the color palette by appending the currently traversed pixel's color value to an end of the sequence of palette color values, corresponding to a lowest rank of the color palette, and code into a data stream a color palette information on the color palette as updated after traversal of the pixels along the first scan order; traverse pixels of a predetermined region of the pixel array along a second scan order so as to associate each pixel with a corresponding one of the sequence of palette color values included in the color palette coded into the data stream, code into the data stream an information associating each pixel with the palette color value of the color palette the respective pixel is associated with, wherein the first and second scan orders are different.

According to another embodiment, an encoding method for encoding a pixel array by palette coding may have the steps of: traversing pixels of a predetermined region of the pixel array along a first scan order with, if the currently traversed pixel's color value does not fulfill a predetermined similarity criterion with respect to any of a sequence of palette color values currently included in the color palette, updating the color palette by appending the currently traversed pixel's color value to an end of the sequence of palette color values, corresponding to a lowest rank of the color palette, and coding into a data stream a color palette information on the color palette as updated after traversal of the pixels along the first scan order; traversing pixels of a predetermined region of the pixel array along a second scan order so as to associate each pixel with a corresponding one of the sequence of palette color values included in the color palette coded into the data stream, code into the data stream an information associating each pixel with the palette color value of the color palette the respective pixel is associated with, wherein the first and second scan orders are different.

Another embodiment may have a non-transitory digital storage medium having a computer program stored thereon to perform the method for encoding a pixel array by palette coding, including: traversing pixels of a predetermined region of the pixel array along a scan order with, if the currently traversed pixel's color value does not fulfill a predetermined similarity criterion with respect to any of a sequence of palette color values currently included in the color palette, updating the color palette by appending the currently traversed pixel's color value to an end of the sequence of palette color values, corresponding to a lowest rank of the color palette, and, if the currently traversed pixel's color value fulfills the predetermined similarity criterion with respect to at least one of the sequence of palette color values currently included in the color palette, increasing a rank of the palette color value of highest rank among the at least one of the sequence of palette color values currently included in the color palette by one; and coding into a data stream: a color palette information on the color palette; an information associating each pixel with a respective palette color value of the color palette, when said computer program is run by a computer.

Another embodiment may have a non-transitory digital storage medium having a computer program stored thereon to perform the method for encoding a pixel array by palette coding, including: traversing pixels of a predetermined region of the pixel array along a scan order with, if the currently traversed pixel's color value does not fulfill a predetermined similarity criterion with respect to any of a sequence of palette color values currently included in the color palette, updating the color palette by appending the currently traversed pixel's color value to an end of the sequence of palette color values, corresponding to a lowest rank of the color palette, and, if the currently traversed pixel's color value fulfills a predetermined similarity criterion with respect to at least one of the sequence of palette color values currently included in the color palette, performing an adaptation of a rank order among the palette color values currently included in the color palette depending on with which of the sequence of palette color values currently included in the color palette the currently traversed pixel the currently traversed pixel's color value fulfills a predetermined similarity criterion; coding into a data stream: a color palette information on the color palette; an information associating each pixel with a respective palette color value of the color palette, wherein the currently traversed pixel's color value fulfills the predetermined similarity criterion with respect to a predetermined palette color value among the sequence of palette color values currently included in the color palette if a difference between the currently traversed pixel's color value and predetermined palette color succeeds a predetermined threshold wherein the threshold depends on a rank of the predetermined palette color value within the sequence of palette color values, when said computer program is run by a computer.

Another embodiment may have a non-transitory digital storage medium having a computer program stored thereon to perform the method for encoding a pixel array by palette coding, including: traversing pixels of a predetermined region of the pixel array along a scan order with, if the currently traversed pixel's color value does not fulfill a predetermined similarity criterion with respect to any of a sequence of palette color values currently included in the color palette, updating the color palette by appending the currently traversed pixel's color value to an end of the sequence of palette color values, corresponding to a lowest rank of the color palette, and adapting a rank order among the palette color values currently included in the color palette while traversing the pixels, and/or limiting a number of the palette color values in the color palette, coding into a data stream: a color palette information on the color palette; an information associating each pixel with a respective palette color value of the color palette, wherein the scan order sequentializes the pixels in a manner so that more than a quarter of in scan order immediately consecutive pairs of pixels include pixel borders distanced from another by at least an inner of another pixel, when said computer program is run by a computer.

Another embodiment may have a non-transitory digital storage medium having a computer program stored thereon to perform the method for encoding a pixel array by palette coding, including: traversing pixels of a predetermined region of the pixel array along a first scan order with, if the currently traversed pixel's color value does not fulfill a predetermined similarity criterion with respect to any of a sequence of palette color values currently included in the color palette, updating the color palette by appending the currently traversed pixel's color value to an end of the sequence of palette color values, corresponding to a lowest rank of the color palette, and coding into a data stream a color palette information on the color palette as updated after traversal of the pixels along the first scan order; traversing pixels of a predetermined region of the pixel array along a second scan order so as to associate each pixel with a corresponding one of the sequence of palette color values included in the color palette coded into the data stream, code into the data stream an information associating each pixel with the palette color value of the color palette the respective pixel is associated with, wherein the first and second scan orders are different, when said computer program is run by a computer.

It is a basic aspect of the present application how to efficiently create a suitable palette for low complexity image and video coding. A combination of the palette coding with transform coding is feasible.

According to an embodiment of the present application, an encoder for encoding a pixel array by palette coding is provided that traverses the pixels of a predetermined region of the pixel array. In case that the color value of a pixel is not similar enough to already present color values in a color palette, the color value is appended to the end of the color palette corresponding to a lowest rank, when the color value of a pixel is similar enough, the rank of the palette color value is increased by one. Then color palette information and information that associates each pixel with a color value of the palette are coded into a data stream.

According to another embodiment of the present application, an encoder for encoding a pixel array by palette coding is provided that traverses the pixels of a predetermined region of the pixel array. In case that the color value of a current pixel is not similar enough to already present color values in a color palette, the color value is appended to the end of the color palette corresponding to a lowest rank, when the color value of the current pixel is similar enough the rank order of the palette color values is adapted depending on to which of the present color values in the color palette the color of the current pixel is similar. The similarity criterion depends on the rank of the color value within the color palette. Then color palette information and information that associates each pixel with a color value of the palette are coded into a data stream.

According to a further embodiment of the present application, an encoder for encoding a pixel array by palette coding is provided that traverses the pixels of a predetermined region of the pixel array. In case that the color value of a current pixel is not similar enough to already present color values in a color palette, the color value is appended to the end of the color palette corresponding to a lowest rank. The rank order is adapted while the pixels are traversed; additionally or alternately the number of color values in the color palette is limited. Then color palette information and information that associates each pixel with a color value of the palette are coded into a data stream.

According to a yet further embodiment of the present application, an encoder for encoding a pixel array by palette coding is provided that traverses the pixels of a predetermined region of the pixel array according to a scan order. In case that the color value of a current pixel is not similar enough to already present color values in a color palette, the color value is appended to the end of the color palette corresponding to a lowest rank. Then color palette information obtained in the scan order is coded into a data stream. The pixels of the predetermined region of the pixel array are traversed again according to a different scan order, during traversing each pixel is associated with a corresponding color value of the color palette, and information associating each pixel with the corresponding color value of the palette is coded into the data stream.

BRIEF DESCRIPTION OF THE DRAWINGS

Embodiments of the present invention will be detailed subsequently referring to the appended drawings, in which.

DETAILED DESCRIPTION OF THE INVENTION

Low complexity image video coding is the challenge of achieving good compression efficiency while limiting the computational effort. Typically, targeted compression ratios range from 1:2 to 1:6. Key requirements for low complexity image video coding are simple implementation, e.g. on FPGA, SW and GPU as well as high throughput capability.

Compression of image data can either be lossy or lossless. In the case of lossless data compression, also referred as "byte packing", the compression is performed such that an exact copy of the input data is obtained when decompressing the compressed data. This property is advantageous in particular when compressing computer programs or databases wherein exact replication of the original data is may be used. Lossy compression, which in many cases has a better compression ratio than the lossless compression has the drawback that the original information cannot be exactly obtained upon decompression, in other words, there is a loss of information during this kind of compression.

Figure 1:
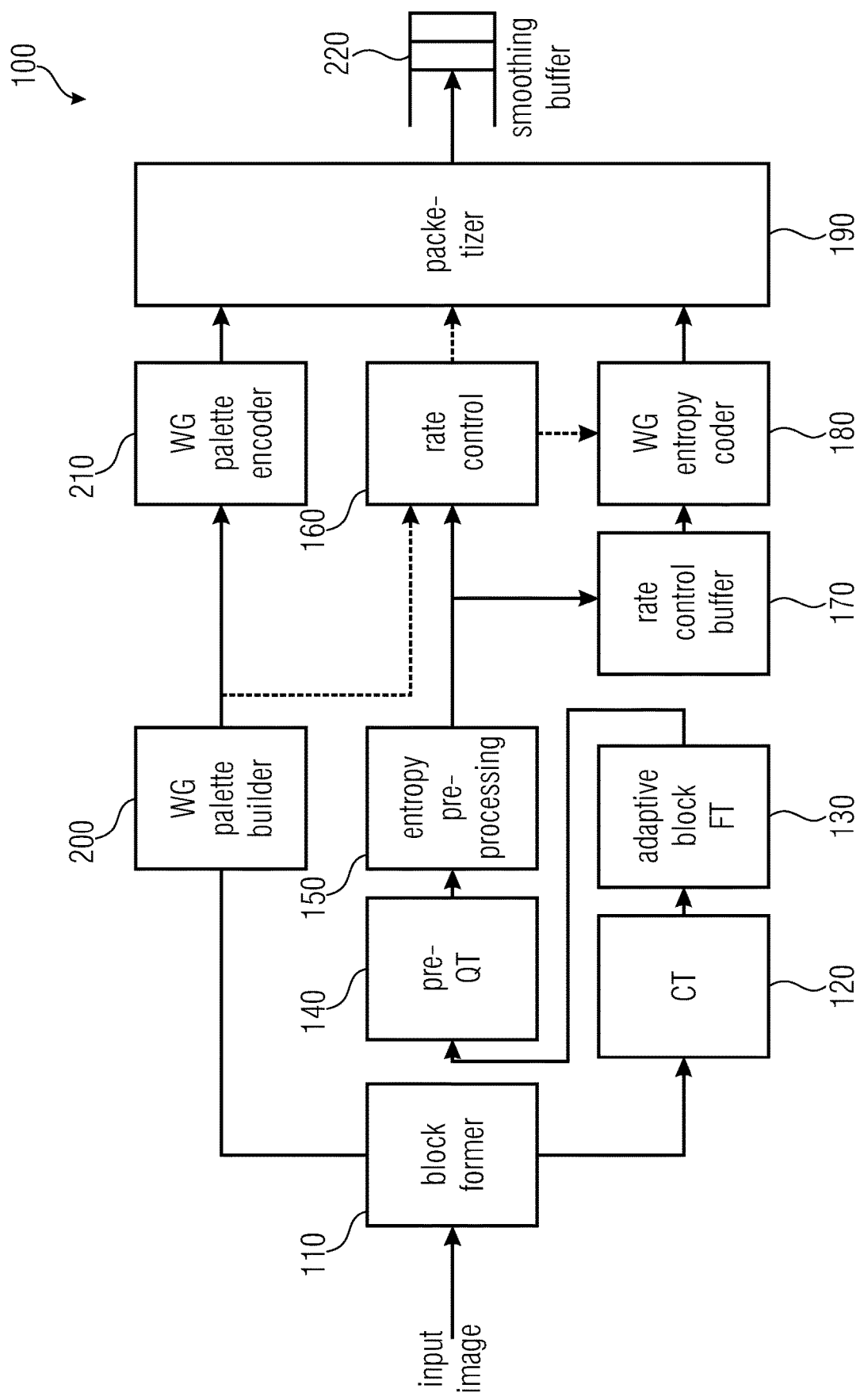
FIG. 1 shows a block diagram of an encoder according to an embodiment of the present invention.

FIG. 1 shows a block diagram of an encoder 100 according to an exemplary embodiment of the present invention, the encoder uses a palette mode in combination with a transform based block coder.

The encoder 100 comprises a block former module 110 which partitions an input image into transform blocks for further processing. These blocks are output both to color transformation, CT, module 120 and workgroup, WG, palette builder module 200.

The color transformation, CT, module 120 may transform the color values of the pixels of the input image block according to a color scheme. In embodiments, the CT module 120 may form a color space transformation between, for instance, RGB and YCC or vice versa or the like. The CT module 120 outputs the transformed image block to the adaptive block frequency transformation, FT, module 130.

The adaptive block FT module 130 may transform the color transformed image block into the frequency domain, helping to facilitate compression, and outputs the transformed image block such as in form of a transform coefficient block to the pre-quantization transformation, Pre-QT, module 140.

The Pre-QT module 140 quantizes the values of the color and frequency transformed image block, i.e. the transform coefficients. The result is output to the entropy pre-processing module 150.

The entropy pre-processing module 150 may translate the data received from the pre-QT module 140 into symbols that may facilitate the processing of the information by the workgroup entropy coder 180. The pre-processing includes, for instance, a binarization in order to map inbound syntax elements including, for instance, the transform coefficients, and, optionally, a quantization parameter describing the pre-quantization onto binary symbols so as to be suitable for a binary arithmetic coding, for instance, which is used, for instance, in the entropy coder 180. The output, i.e. the entropy coded bitstream, is sent to the rate control module 160 and is also buffered in the rate control buffer module 170.

The rate control module 160 may control the rate by sending control signals to both the packetizer module 190 and also to a workgroup entropy coder module 180.

The workgroup entropy encoder module 180 receives its input from the rate control buffer module 170 and performs entropy coding, like an arithmetic coding, on the received data. The entropy coded data is output to packetizer module 190.

The packetizer module 190 receives a further input from the workgroup palette encoder 210 which is described further below.

The encoding technique described above and performed by color transformation, CT, module 120, adaptive block frequency transformation, FT, module 130, pre-quantization transformation, Pre-QT, module 140, entropy pre-processing module 150, rate control buffer module 170 and workgroup entropy encoder module 180 is referred to as 'transform mode' coding, as opposed to 'palette mode' coding described in the following. In other words, block former 110 subjects the blocks of the picture to be coded to two types of coding modes among which, finally, one is chosen according to some criterion such as rate/distortion criterion, and the selection is signaled in the data stream. Further details are set out below. The following paragraphs concentrate on the other coding mode. Later on, an embodiment is described based on which it gets clear that the latter coding mode may be, according to an alternative embodiment, the only coding mode or a coding mode offered along with a different coding mode other than described above as the transform mode.

As mentioned above, the transform block formed by the block former module 110 is also received by the workgroup, WG, palette builder module 200. The WG palette builder module 200 may create a color palette according to an embodiment of the present invention. The generation of the palette is described in further detail below. The WG palette builder module 200 outputs the created palette as well as the received transform block to workgroup palette encoder module 210. The WG palette encoder module 210 encodes the transform block of the image pixel-wise using the palette created by the WG palette builder module 200 and outputs the result, together with information about the palette used, to the packetizer module 190.

Finally, the packetizer module 190 may packetize the inputs received from the WG entropy encoder module 180 or the WG palette encoder module 210 and outputs it to smoothing buffer module 220. The smoothing buffer module 220 may buffer the received compressed transform blocks and may output these continuously at a constant data rate, thereby smoothing the output bitstream.

Even though the encoder has been described as comprising constituent modules like color transformation, CT, module 120, adaptive block frequency transformation, FT, module 130, pre-quantization transformation, Pre-QT, module 140 and entropy pre-processing module 150, it is clear to the person skilled in the field of image compression that some or all of these modules are optional and that embodiments of the invention may be performed without or a subset of these modules.

Figures 2, 3:
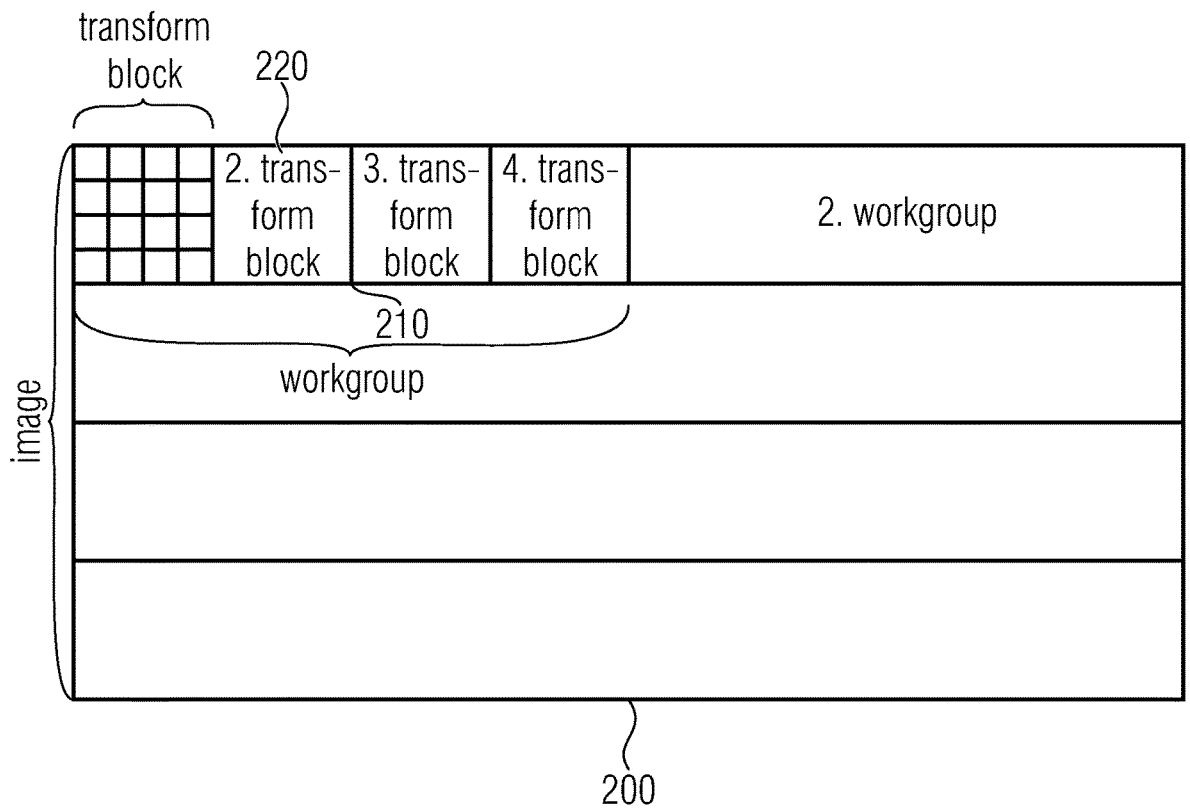
FIG. 2 shows a geometrical model of the subdivision of an image according to an embodiment of the present invention.
FIG. 3 shows possible scan patterns according to embodiments of the present invention.

FIG. 2 shows in a conceptual drawing how the image is subdivided into workgroups and then how the workgroups are subdivided into transform blocks according to an embodiment. The image 200 may be subdivided into horizontal 'stripes', in this example each stripe comprises four pixels in the vertical dimension. Each of the stripes may be subdivided into workgroups 210, wherein in this example each workgroup comprises 16 pixels in horizontal direction and 4 pixels in vertical direction. Each workgroup is further subdivided into transform blocks 220, which in this case, comprises 4×4 pixels. Such a transform block may be a predetermined region of the pixel array being the representation of the picture to be encoded.

Even though a block has the size of 4×4 pixels in this example, it is possible, in other embodiments, that the block sizes are 8×8, 8×4, or 8×2. Even though it is shown that a workgroup comprises four blocks, it is possible that also eight or sixteen blocks form one workgroup. In an even more general case, there is no need that the block size or workgroup size is restricted to powers of two, i.e. the block size can be m×n pixels and a workgroup can comprise k blocks with k, n and m being any natural number.

According to an embodiment, the encoding mode, a palette mode or a transform coding mode, is selected per workgroup, i.e. an entire workgroup is coded either in the palette mode or in the transform coding mode.

The palette mode encoding is performed in two steps, described in detail below. First a palette is generated based on the colors of the pixels in a workgroup. In a second step, the palette index for each pixel in a workgroup is determined and the palette entries and indices are written the byte stream, if the palette mode is selected.

Palette Generation

When the transform blocks of a workgroup are received, the palette generation process starts with an empty palette. The color of the first pixel in a workgroup is then added as the first palette entry. Then the color values of all pixels of a workgroup are compared to the already existing palette entries, the comparison is performed in the order from the first palette entry to the last. If the difference of the color value of a pixel to a color value in the palette is less than a threshold then the color value of this pixel is deemed as already present in the palette and the comparison to the palette entries is stopped for this pixel. If the matching palette entry is not the first palette entry, this palette entry is moved one position to the front of the palette. If the color value of a pixel is not present in the palette, then this color value is appended to the palette as long as the maximum palette size is not exceeded.

The measure for the difference between the color value of a pixel and a color value in the palette is computed as a weighted sum of the absolute differences of the color components. Usually the green color component is weighted most and the red and blue components are weighted less.

The threshold used to determine if a color value is already present in the palette may not be fixed but may be dependent on the position in the palette. In an embodiment, the threshold is smaller at the front of the list and larger at the end. This adaptive threshold, in conjunction with the process of moving palette entries to the front of the palette if a color value of a pixel matches this palette entry, has the effect that pixel color values that occur frequently in a workgroup are represented with a higher precision than color values that occur less frequently. This optimizes the palette both for a small number of entries and for low distortion.

The last two paragraphs can be implemented by the following formula:

$$4 \cdot d_r + 5 \cdot d_g + 3 \cdot d_b \leq (i+1) << 2$$

Where $d_r$, $d_g$ and $d_b$ are the absolute differences of the red, green and blue components of the color values of the pixel and the palette entry and i is the index of the palette entry in the palette with i=0 being the frontmost palette entry. As mentioned before, the green component is weighted most while red and blue are weighted less, and it is clear that the individual weighing factors are merely examples.

The aspect that a palette entry for a color that is already present in the palette is moved in direction to the front of the palette, e.g. by one position, each time the color occurs, and appending colors to the end of the palette when they occur for the first time provides a ranking concept for color entries. This ranking represents the frequency of occurrence of a certain color. An advantage is that each time the palette is scanned through starting at the beginning of the palette, this scanning will first come across color values that were more frequently found and the likelihood that the color of a new pixel is one of the first entries is expected to be larger and the scanning can then stop earlier, thereby saving time. In embodiments, in order to optimize throughput, a comparison to all palette entries may be performed in parallel; this may be done by an implementation in hardware or software.

As neighboring pixels very likely have similar color values it is beneficial to perform the palette generation not in raster scan order but in another scan pattern to populate the palette with different color values early in the palette generation process. A suitable scan pattern is shown in FIG. 3.

FIG. 3 gives examples for two possible scan patterns for palette generation. The two scan patterns are rather similar; the difference between these two examples is that the position of the $14^{th}$ and $15^{th}$ scanning position are exchanged. The scanning is performed in the order starting with the pixel at position 0, then pixel at position 1, position 2 and so on, ending with position 15. These two scan patterns are mere examples, and it is clear that any possible scan order can be applied, some orders being more advantageous than others.

Mode Decision

As mentioned before, the encoder may decide which coding mode, either the palette mode or the transform coding mode, is to be applied to the presently processed workgroup. The coding mode is decided on the following conditions:

1. The palette has a predefined maximum size, e.g. maximum 16 entries. If during palette generation more than this maximum number of palette entries are allocated the palette generation is aborted and palette mode for this workgroup is disabled, i.e this workgroup is coded in transform mode.

2. If the number of bits needed for palette mode is less than the number of bits needed for transform mode the workgroup is coded in palette mode. It is noted that this decision depends on the selected rate control parameter for transform coding.

3. If the coding error (distortion) of the palette mode is very low and the number of bits needed for the palette mode is less than a threshold depending on the number of bits that would be needed if the workgroup was coded in transform mode with very low error then the workgroup is coded in palette mode despite transform mode at the actual quantization would consume less bits.

The above mentioned decision criteria are optimized for low implementation complexity. If higher implementation complexity is acceptable or intended, more complex decision criteria may be employed, e.g. full rate distortion optimization, RDO, or a criterion based on just noticeable differences, JND.

Palette Mode Coding

The creation of the palette to be used as well as the decision which kind of coding will be applied have been described before, in the following details on the coding process are discussed.

For coding of the transform blocks of the workgroup in palette mode, the following syntax elements are employed:
 A flag for selecting between palette mode and transform mode If palette mode is selected as coding mode:
 The number of palette entries minus one, as at least one entry may be present
 The actual palette entries, i.e. the color samples
 If the palette has more than one entry the indices for all pixels in the workgroup. The number of bits needed per index depends on the number of palette entries, e.g. for 2 entries 1 bit per index, for 3 or 4 entries 2 bits per index, for 5 to 8 entries 3 bits per index, for 9 to 16 entries 4 bits per index, . . . .
 If there is only one palette entry then no indices are encoded as all pixels in the workgroup are of the same color value.

Simple fixed length coding may be used for the palette indices because this yields the lowest implementation complexity, especially for hardware implementations. If higher implementation complexity is acceptable, variable length coding for the palette indices may be easily applied as the palette generation process already orders the palette entries according to the frequency of occurrence of the color values.

Summarizing the above, according to a first aspect of the present application, a pixel array encoder for encoding a pixel array by palette coding is made more efficient in terms of a less complex implementation by populating the color palette during traversing the pixels of a predetermined region of the pixel array, associating a currently traversed pixel with a palette color value of highest rank among one or more of the sequence of palette color values currently contained in the color palette and increasing a rank of the palette color value thus associated with the currently traversed pixel by one. By this measure, the adaptation of the rank order among the palette color values within their color palette is, in a manner corresponding to very low complexity, adapted to substantially mirror a significance of the palette color values contained in the color palette in terms of "representative characteristic", i.e. in terms of the capability of the respective palette color value to efficiently represent the color values of the pixels within the predetermined region. A capability to efficiently represent color values of pixels within the predetermined region means, for instance, that the respective palette color value is similar to, i.e. representative of, a high number of color values of pixels within the predetermined region. The higher this number is, the higher its capability of efficiently representing is. No count of associations with a certain palette color value within the color palette has to be monitored during traversing the pixels of the predetermined region. Rather, it suffices to adapt the rank order simply by changing the palette color value associated with a currently traversed pixel with the rank of a palette color value of immediately higher rank.

Figure 4:
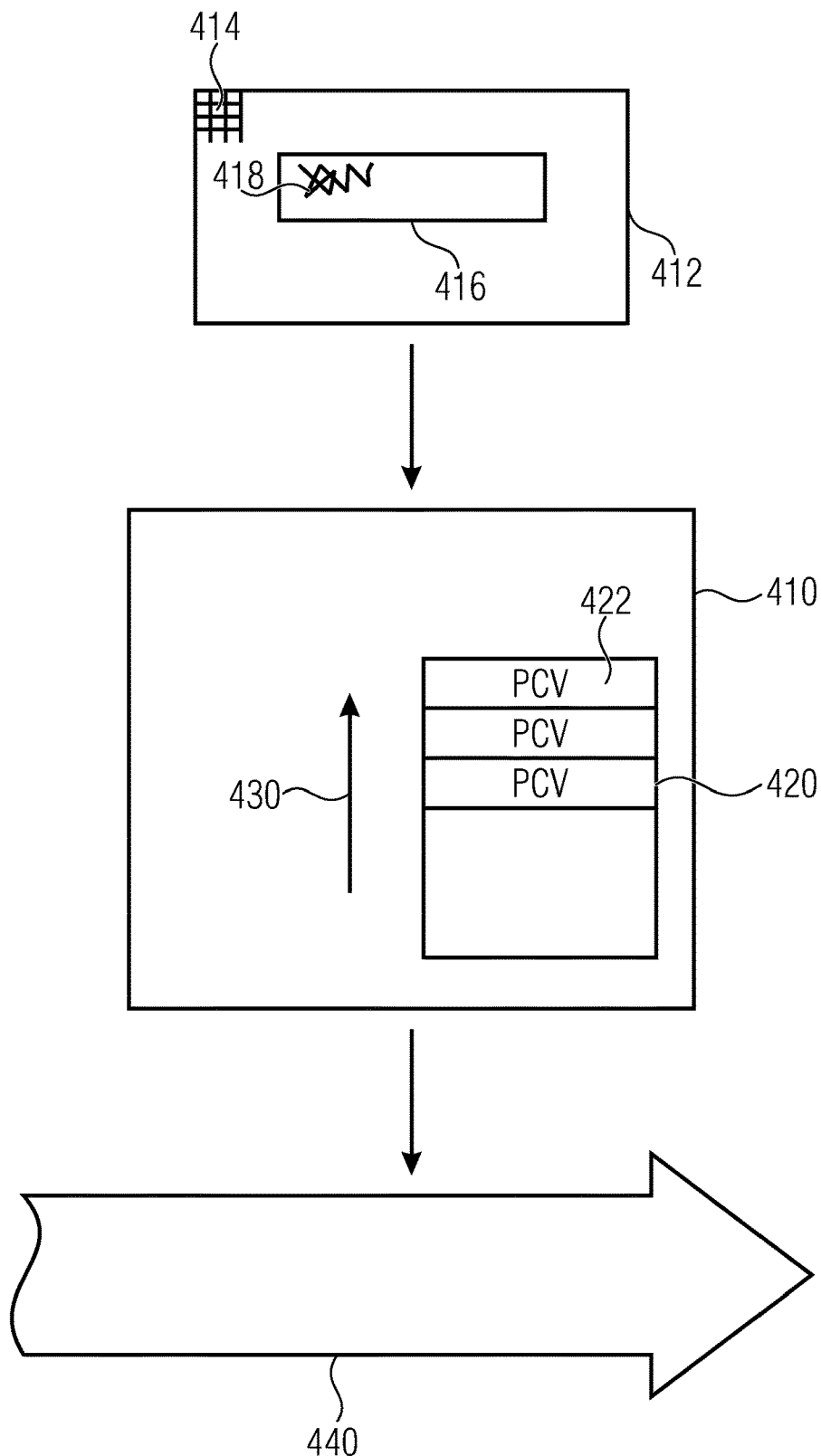
FIG. 4 shows an operating mode of the encoder according to an embodiment of the present invention.

Thus, the first aspect concerns, for instance, an encoder like encoder 410 depicted in FIG. 4 which encodes a pixel array 412 by palette coding. The encoder 410 traverses pixels 414 of the pixel array 412 within a predetermined region 416 of the pixel array along a scan order 418 while, during the traversal, populating an internally logged color palette 420 with representative color values of pixels traversed, adapting a rank order among palette color values, PCV, 422 stored in color palette 420 and associating the pixels 414 within region 416 to palette color values 422 in color palette 420.

Figure 5:
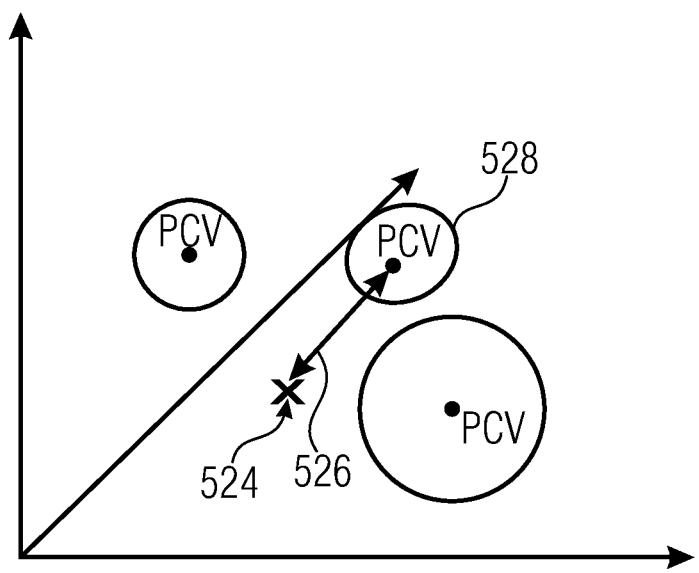
FIG. 5 shows an example for a predetermined color space according to an embodiment of the present invention.

The encoder of FIG. 4 traverses pixels 414 within the predetermined region 416 and checks, as illustrated in FIG. 5, whether a currently traversed pixel's color value does not fulfill a predetermined similarity criterion with respect to any of the sequence of palette color values 422 currently contained in the color palette 420 or if the currently traversed pixel's color value fulfills a predetermined similarity criterion with respect to at least one of the sequence of palette color values 422. For example, FIG. 5 illustrates a predetermined color space, here exemplarily spanned by three axes which may, for instance, be red, green and blue. The color value of a currently traversed pixel is illustrated by a cross 524. The palette color values are depicted by dots and indicated using PCV. With respect to a certain palette color value, the predetermined similarity criterion is fulfilled, for instance, if a distance 526 between the currently traversed pixel's color value 524 and the respective palette color value succeeds a predetermined threshold which, as illustrated in FIG. 5, might be thought of spanning a certain region 528 surrounding the respective palette color value. The distance 526 is, for instance, measured using the left hand part of the inequality discussed above, i.e. $4 \cdot d_r + 5 \cdot d_g + 3 \cdot d_b$. The respective weight factors of 4, 5 and 3 are merely examples; it is evident that any other choice of weights may be appropriate. The threshold may be, but according to the present application does not necessarily have to be, dependent on the rank of the respective palette color value within the color palette 420. In particular, the palette color value 422 currently contained in color palette 420 form a list or sequence ordering the palette color values 422 along a rank order 430. If a certain currently traversed pixel value does not fulfill a predetermined similarity criterion with respect to any of the palette color values 422 currently stored in the color palette 20, same is appended at the end of the list of palette color values 422, thus then corresponding to the lowest rank of the color palette 420. The appending may be performed conditionally only then if a maximum number of palette color values 22 within color palette 420 has not yet been reached.

If a currently traversed pixel's color value 524 fulfills the predetermined similarity criterion with respect to a certain palette color value 422, then encoder 410 associates this currently traversed pixel with this palette color value. If there are more palette color values in the color palette 420 with respect to which the predetermined similarity criterion is fulfilled by the currently traversed pixel's color value, then encoder 410 associates the currently traversed pixel with a color value of highest rank among these palette color values.

Figure 6:
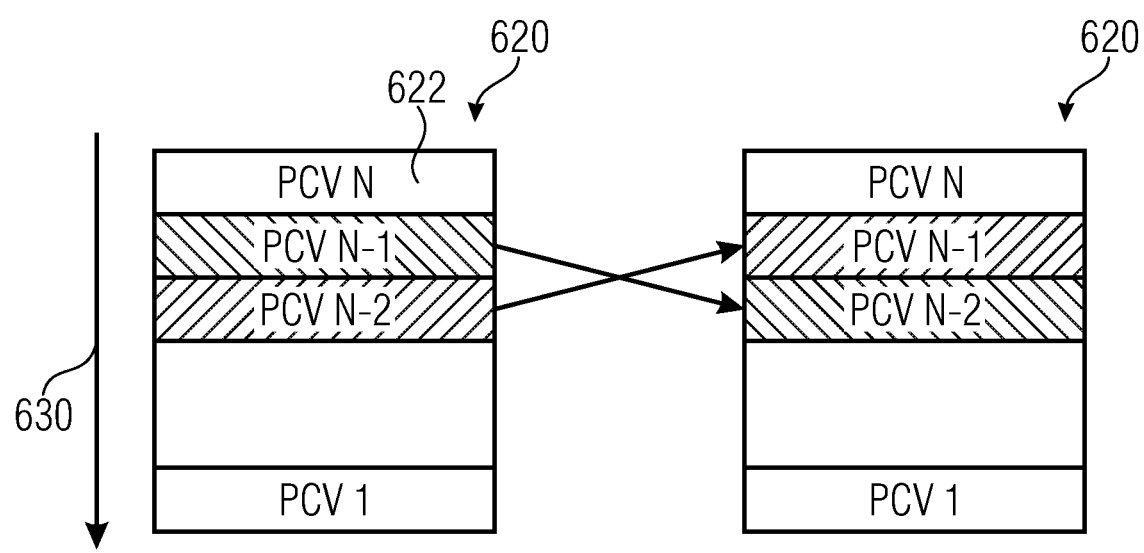
FIG. 6 shows the adaption of the rank order according to an embodiment of the present invention.

The adaptation of the rank order 630 is performed as depicted in FIG. 6. The left-hand side of FIG. 6 shows the content of color palette 620 at the time of encountering a certain pixel 414 within region 418. As shown, the color palette 620 contains at that time N palette color values PCV i, with i indicating the rank. At the right-hand side, FIG. 6 illustrates the case that the currently traversed pixel has been determined to be similar to palette color value PCV N−2.

The currently traversed pixel's color value might have been similar to palette color values 622 of lower rank 2, but encoder 410 may not even have checked this circumstance. Rather, encoder 410 has checked that the currently traversed pixel's color value is not similar to any palette color value 622 of higher rank, i.e. here neither to PCV N−1 and PCV N. As a result, encoder 410 increases the rank of palette color value N−2 so that the latter palette color value becomes palette color value at rank N−1, while the palette color value formerly positioned at rank N−1 now becomes palette color value at rank N−2. Index i indexes the palette color values in a direction contrary to rank order 430, i.e. from the palette color value of highest rank to palette color value to lowest rank, i.e. i=0 is associated to PCV N Finally, the encoder encodes into a data stream 440 color palette information on the color palette 420 manifesting itself at the end of traversing the pixels 414 within region 416 as well as information indicating for each pixel 414 within region 416 as to which palette color value the respective pixel has been associated with. In this regard, please note that each pixel which had been associated with palette color value N−1 before encountering the pixel discussed with respect to FIG. 6, remain associated with this palette color value even though same changes its rank within the color palette 620 due to the adaptation of the rank order responsive to the currently traversed pixel.

In accordance with a second aspect of the present application, the encoder 410 of FIG. 4 does not necessarily perform the adaptation of the rank order 430 in the manner explained with respect to FIG. 6. Rather, alternatively, the encoder in accordance with the second aspect the present application may, for instance, log for each palette color value 422 within color palette 420 the number of times a certain pixel's color value has been associated with the respective palette color value with adapting the rank order to correspond to the count of associated pixels: the higher the count of associated pixels is for a certain palette color value, the higher its rank in the color palette 420 is.

However, in accordance with a second aspect of the present application, the encoder 410 is configured such that the aforementioned threshold defining the similarity criterion depends on the rank of the palette color values 422 within color palette 420. That is, whether a currently traversed pixel's color value 424 fulfills the similarity criterion with respect to a certain palette color value 422 depends on the rank of the respective palette color value within color palette: the threshold is lower or smaller the higher the rank of the respective color value is. An example has been given on the right-hand side of the inequality shown above. Here, i indexes the palette color values in a direction contrary to rank order 430, i.e. from the palette color value of highest rank to palette color value to lowest rank, i.e. i=0 is associated to PCV N.

By this measure, the second aspect achieves an efficient way of palette coding. As long as the number of palette color values within the color palette is relatively low, the representative palette color values within the color palette are supposed to relatively closely correspond to the color values of the pixels which are associated with these palette color values. However, as soon as the number of palette color values increases, the color palette might be in danger of running into to a situation where the color palette gets full, i.e. the maximum number of palette color values is reached, or, if such a maximum number does not exist, that the maximum number gets unreasonably large. Accordingly, a kind of "break" is implemented by relaxing the similarity criterion for palette color values of lower rank, i.e. ones having been appended but having been associated with previous pixels merely seldomly.

In accordance with the third aspect of the present application, it is optional for encoder 410 to perform the rank order adaptation according to FIG. 6 and/or to use the just-outlined rank-dependent similarity criterion. However, in accordance with the third aspect of the present application, the encoder 410 uses a scan order 418 among pixels 414 according to which the pixels are sequentialized in a manner such that more than a quarter, i.e. 25%, of in scan order immediately consecutive pairs of pixels have pixel borders which are distant from one another by at least an inner or enclosed area of another pixel. For example, see the pair of pixels 0 and 1 in FIG. 3. Their pixel borders have a distance which may be determined by the smallest distance between their borders, i.e. the one connecting the bottom right corner of pixel 0 with the top left corner of pixel 1. The line connecting these pixels traverses to other pixels, namely pixels 14 and 2. Contrary thereto, the immediately consecutively scanned pixels 15 and 14 have borders which abut each other, namely at one corner thereof. However, all in all, there are more than 25% of immediately consecutive pixels along scan order, for which their pixel borders do not abut each other, namely pairs 0-1, 3-4, 4-5, 6-7, 8-9, 9-10, 12-13. The overall number of immediately consecutive pairs is 15.

It should have become clear from the above description of embodiments in the current section that the encoder 410 may or may not be operative to code other regions of image 412 by another coding mode, such as a transform coding mode according to which the respective region is transformed into one or more transform blocks with coding the transform coefficients into data stream 440. The regions may be composed of one or more of pixel blocks which are individually transformed into a transform block.

The following should be noted with respect to the above description. The above description of embodiments assumed that palette generation and coding of the pixels by way associating them to the palette is performed in one single step. However, advantageously, the process is performed twice: in a first pass, the palette is built. Then, the pixel in the predetermined region, e.g. workgroup, is scanned or traversed again. In the second scan, a different rater scan order might be used, i.e. a scan order other than the one used in the first pass concerning palette building. The color palette as determined in the first pass might remain fixed during the second pass where the pixels are associated to the palette color values. In the second pass, the threshold may be defined differently and each pixel might be associated with highest-rank candidate among the sufficiently similar palette color values. For example, the threshold might be fixed or independent from the rank of the respective palette color value. Alternatively, the most similar palette color value is associated with a respect pixel irrespective of the rank order.

The latter aspect represents a fourth aspect of the present application. Here, the encoder merely optionally also inherits any of the previously described three aspects.

According to this fourth aspect, two different scan orders are used, a first scan order that is used to build the color palette and a second scan order to apply the build palette to the individual pixels of the transform block.

The first scan order may be chosen according to criteria that can lead to a better palette, i.e. the first scan order provides a sequence for the scanning that ensures that the average spatial distance of consecutively scanned pixels is as large as possible, or at least above a certain value. As described before, it is advantageous during palette building that the spatial distance of pixels scanned consecutively is large because two neighboring pixels are likely to have the same or very similar color what may lead to a 'distorted' palette, i.e. the palette may overemphasize a certain color. The second scan order may differ from the first scan order in that the spatial distance of consecutively scanned pixels is not taken into consideration, but that the scan order is computationally most effective, e.g. time or memory saving. Such a scan order may be a raster scan order where the pixels are scanned in ascending sequence, e.g. in the case of a 4×4 transform block in the sequence 0, 1, 2 . . . 15. When choosing a color for a certain pixel from the palette, the closest color value, i.e. the color with the smallest distance computed according to the formula defined further above, may be chosen, but also the rank of the color value may be considered in the sense that the distance of the color of a pixel to a color of the color palette may not be the pure distance, e.g. according to the formula $4 \cdot d_r + 5 \cdot d_g + 3 \cdot d_b$ given further above, but the rank of the color value may be considered and may be, for example, multiplied with a weight factor and subtracted from the calculated distance what can lead to a preference of colors with high rank.

According to this embodiment, a first scan order is used for traversing pixels of a predetermined region, e.g. the transform block of the current workgroup. During traversing, the color of a currently traversed pixel is compared to palette color values currently contained in the color palette, and if the currently traversed pixel's color value does not fulfill a predetermined similarity criterion, e.g. the above mentioned distance, with respect to any of the palette color values currently contained in the color palette, the currently traversed pixel's color value is appended to the sequence of palette color values, e.g. at the end. Appending the color value to the end corresponds to a lowest rank of the color palette. Color palette information on the color palette is coded into a data stream after traversal of the pixels along the first scan order. Then a second scan order different from the first scan orders is used to traverse the pixels of the predetermined region again, thereby associating each pixel with a corresponding color value of the sequence of palette color values contained in the color palette and coding information associating each pixel with the palette color value of the color palette the respective pixel is associated with into the data stream.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

While this invention has been described in terms of several embodiments, there are alterations, permutations, and equivalents which fall within the scope of this invention.

It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An encoder configured to encode a pixel array by palette coding, configured to
    traverse pixels of a predetermined region of the pixel array along a scan order,
    if the currently traversed pixel's color value does not fulfill a predetermined similarity criterion with respect to any of a sequence of palette color values currently comprised by the color palette,
        update the color palette by appending the currently traversed pixel's color value to an end of the sequence of palette color values, corresponding to a lowest rank of the color palette, and
    if the currently traversed pixel's color value fulfills the predetermined similarity criterion with respect to at least one of the sequence of palette color values currently comprised by the color palette,
        increase a rank of the palette color value of highest rank among the at least one of the sequence of palette color values currently comprised by the color palette by one; and
    code into a data stream
        a color palette information on the color palette;
        an information associating each pixel with a respective palette color value of the color palette,
    wherein the encoder is configured so that the currently traversed pixel's color value fulfills the predetermined similarity criterion with respect to a predetermined palette color value among the sequence of palette color values currently comprised by the color palette if a difference between the currently traversed pixel's color value and the predetermined palette color value succeeds a predetermined threshold wherein the threshold depends on a rank of the predetermined palette color value within the sequence of palette color values.

2. The encoder according to claim 1, wherein the encoder is configured so that the threshold depends on a rank of the predetermined palette color value within the sequence of palette color values so that the higher the rank of the predetermined palette color value is the lower the threshold is.

3. An encoder configured to encode a pixel array by palette coding, configured to
    traverse pixels of a predetermined region of the pixel array along a scan order,
    if the currently traversed pixel's color value does not fulfill a predetermined similarity criterion with respect to any of a sequence of palette color values currently comprised by the color palette,
        update the color palette by appending the currently traversed pixel's color value to an end of the sequence of palette color values, corresponding to a lowest rank of the color palette, and
    if the currently traversed pixel's color value fulfills the predetermined similarity criterion with respect to at least one of the sequence of palette color values currently comprised by the color palette,
        increase a rank of the palette color value of highest rank among the at least one of the sequence of palette color values currently comprised by the color palette by one; and
    code into a data stream
        a color palette information on the color palette;
        an information associating each pixel with a respective palette color value of the color palette,
    wherein the encoder is configured to measure the difference between the currently traversed pixel's color value and predetermined palette color using a measure being a weighted sum of, and linearly depending on each of, absolute differences of color components of the currently traversed pixel's color value and the predetermined palette color.

4. An encoder configured to encode a pixel array by palette coding, configured to
    traverse pixels of a predetermined region of the pixel array along a scan order,
    if the currently traversed pixel's color value does not fulfill a predetermined similarity criterion with respect to any of a sequence of palette color values currently comprised by the color palette,
        update the color palette by appending the currently traversed pixel's color value to an end of the sequence of palette color values, corresponding to a lowest rank of the color palette, and
    if the currently traversed pixel's color value fulfills the predetermined similarity criterion with respect to at least one of the sequence of palette color values currently comprised by the color palette,
        increase a rank of the palette color value of highest rank among the at least one of the sequence of palette color values currently comprised by the color palette by one; and
    code into a data stream
        a color palette information on the color palette;
        an information associating each pixel with a respective palette color value of the color palette,
    wherein the encoder is configured to refrain from increasing a rank of the palette color value of highest rank by one, if the palette color value with which the currently traversed pixel is associated with, is of highest rank among all palette color values within the color palette.

5. An encoder configured to encode a pixel array by palette coding, configured to
    traverse pixels of a predetermined region of the pixel array along a scan order,
    if the currently traversed pixel's color value does not fulfill a predetermined similarity criterion with respect to any of a sequence of palette color values currently comprised by the color palette,
        update the color palette by appending the currently traversed pixel's color value to an end of the sequence of palette color values, corresponding to a lowest rank of the color palette, and
    if the currently traversed pixel's color value fulfills the predetermined similarity criterion with respect to at least one of the sequence of palette color values currently comprised by the color palette,
        increase a rank of the palette color value of highest rank among the at least one of the sequence of palette color values currently comprised by the color palette by one; and
    code into a data stream
        a color palette information on the color palette;
        an information associating each pixel with a respective palette color value of the color palette,
    wherein the encoder is configured to code the information associating each pixel with a respective palette color value of the color palette by traversing the pixels of a predetermined region of the pixel array a second time with using the color palette as manifesting itself after the traversal of the pixels of the predetermined region along the scan order, associating each pixel with a corresponding one of the sequence of palette color values comprised by the color palette.

6. The encoder according to claim 5, wherein the encoder is configured to, in traversing the pixels of a predetermined region of the pixel array a second time, code for each pixel an index into the data stream which points to the corresponding one of the sequence of palette color values in the color palette.

7. The encoder according to claim 5, wherein the encoder is configured to, in traversing the pixels of a predetermined region of the pixel array a second time, associate each pixel with the one of the sequence of palette color values comprised by the color palette comprising smallest distance to the respective pixel's color value.

8. The encoder according to claim 5, wherein the encoder is configured to, in traversing the pixels of a predetermined region of the pixel array a second time, associate each pixel with the one of highest rank among ones of the sequence of palette color values comprised by the color palette which comprise a distance to the respective pixel's color value which succeeds a threshold equal for all palette color values in the color palette.

9. The encoder according to claim 5, wherein the encoder is configured to, in traversing the pixels of a predetermined region of the pixel array a second time, use a further scan order different from the scan order.

10. The encoder according to claim 9, wherein the encoder is configured so that the further scan order is a raster scan order.

11. An encoding method for encoding a pixel array by palette coding, comprising:

traversing pixels of a predetermined region of the pixel array along a scan order, if the currently traversed pixel's color value does not fulfill a predetermined similarity criterion with respect to any of a sequence of palette color values currently comprised by the color palette, updating the color palette by appending the currently traversed pixel's color value to an end of the sequence of palette color values, corresponding to a lowest rank of the color palette, and if the currently traversed pixel's color value fulfills the predetermined similarity criterion with respect to at least one of the sequence of palette color values currently comprised by the color palette, increasing a rank of the palette color value of highest rank among the at least one of the sequence of palette color values currently comprised by the color palette by one; and coding into a data stream a color palette information on the color palette;
an information associating each pixel with a respective palette color value of the color palette, wherein the information associating each pixel with a respective palette color value of the color palette is coded by traversing the pixels of a predetermined region of the pixel array a second time with using the color palette as manifesting itself after the traversal of the pixels of the predetermined region along the scan order, associating each pixel with a corresponding one of the sequence of palette color values comprised by the color palette.

12. An encoder configured to encode a pixel array by palette coding, configured to traverse pixels of a predetermined region of the pixel array along a scan order, if the currently traversed pixel's color value does not fulfill a predetermined similarity criterion with respect to any of a sequence of palette color values currently comprised by the color palette, update the color palette by appending the currently traversed pixel's color value to an end of the sequence of palette color values, corresponding to a lowest rank of the color palette, and if the currently traversed pixel's color value fulfills a predetermined similarity criterion with respect to at least one of the sequence of palette color values currently comprised by the color palette, perform an adaptation of a rank order among the palette color values currently comprised by the color palette depending on with which of the sequence of palette color values currently comprised by the color palette the currently traversed pixel the currently traversed pixel's color value fulfills a predetermined similarity criterion;

code into a data stream a color palette information on the color palette;
an information associating each pixel with a respective palette color value of the color palette, wherein the encoder is configured such that the currently traversed pixel's color value fulfills the predetermined similarity criterion with respect to a predetermined palette color value among the sequence of palette color values currently comprised by the color palette if a difference between the currently traversed pixel's color value and the predetermined palette color value succeeds a predetermined threshold wherein the threshold depends on a rank of the predetermined palette color value within the sequence of palette color values.

13. The encoder according to claim 12, wherein the encoder is configured to if the currently traversed pixel's color value fulfills the predetermined similarity criterion with respect to at least one of the sequence of palette color values currently comprised by the color palette, associate the currently traversed pixel with the palette color value of highest rank among the at least one of the sequence of palette color values currently comprised by the color palette.

14. The encoder according to claim 12, wherein the encoder is configured so that the threshold depends on a rank of the predetermined palette color value within the sequence of palette color values so that the higher the rank of the predetermined palette color value is the lower the threshold is.

15. The encoder according to claim 12, wherein the encoder is configured to measure the difference between the currently traversed pixel's color value and predetermined palette color using a measure being a weighted sum of, and linearly depending on each of, absolute differences of color components of the currently traversed pixel's color value and the predetermined palette color.

16. The encoder according to claim 12, wherein the encoder is configured to, in performing the adaptation of the rank order among the palette color values currently comprised by the color palette, increase a rank of the palette color value of highest rank among the at least one of the sequence of palette color values currently comprised by the color palette by one.

17. The encoder according to claim 16, wherein the encoder is configured to refrain from increasing a rank of the palette color value of highest rank by one, if the palette color value with which the currently traversed pixel is associated with, is of highest rank among all palette color values within the color palette.

18. The encoder according to claim 12, wherein the encoder is configured to code the information associating each pixel with a respective palette color value of the color palette by traversing the pixels of a predetermined region of the pixel array a second time with
  using the color palette as manifesting itself after the traversal of the pixels of the predetermined region along the scan order,
  associating each pixel with a corresponding one of the sequence of palette color values comprised by the color palette.

19. The encoder according to claim 18, wherein the encoder is configured to, in traversing the pixels of a predetermined region of the pixel array a second time, code for each pixel an index into the data stream which points to the corresponding one of the sequence of palette color values in the color palette.

20. The encoder according to claim 18, wherein the encoder is configured to, in traversing the pixels of a predetermined region of the pixel array a second time,
  associate each pixel with the one of the sequence of palette color values comprised by the color palette comprising smallest distance to the respective pixel's color value.

21. The encoder according to claim 18, wherein the encoder is configured to, in traversing the pixels of a predetermined region of the pixel array a second time,
  associate each pixel with the one of highest rank among ones of the sequence of palette color values comprised by the color palette which comprise a distance to the respective pixel's color value which succeeds a threshold equal for all palette color values in the color palette.

22. The encoder according to claim 18, wherein the encoder is configured to, in traversing the pixels of a predetermined region of the pixel array a second time,
  use a further scan order different from the scan order.

23. The encoder according to claim 22, wherein the encoder is configured so that the further scan order is a raster scan order.

24. An encoding method for encoding a pixel array by palette coding, comprising:
  traversing pixels of a predetermined region of the pixel array along a scan order,
  if the currently traversed pixel's color value does not fulfill a predetermined similarity criterion with respect to any of a sequence of palette color values currently comprised by the color palette,
    updating the color palette by appending the currently traversed pixel's color value to an end of the sequence of palette color values, corresponding to a lowest rank of the color palette, and
  if the currently traversed pixel's color value fulfills a predetermined similarity criterion with respect to at least one of the sequence of palette color values currently comprised by the color palette,
    performing an adaptation of a rank order among the palette color values currently comprised by the color palette depending on with which of the sequence of palette color values currently comprised by the color palette the currently traversed pixel the currently traversed pixel's color value fulfills a predetermined similarity criterion;
  coding into a data stream
    a color palette information on the color palette;
    an information associating each pixel with a respective palette color value of the color palette,
  wherein the currently traversed pixel's color value fulfills the predetermined similarity criterion with respect to a predetermined palette color value among the sequence of palette color values currently comprised by the color palette if a difference between the currently traversed pixel's color value and the predetermined palette color value succeeds a predetermined threshold wherein the threshold depends on a rank of the predetermined palette color value within the sequence of palette color values.

25. A non-transitory digital storage medium having a computer program stored thereon to perform the method for encoding a pixel array by palette coding, comprising:
  traversing pixels of a predetermined region of the pixel array along a scan order,
  if the currently traversed pixel's color value does not fulfill a predetermined similarity criterion with respect to any of a sequence of palette color values currently comprised by the color palette,
    updating the color palette by appending the currently traversed pixel's color value to an end of the sequence of palette color values, corresponding to a lowest rank of the color palette, and
  if the currently traversed pixel's color value fulfills the predetermined similarity criterion with respect to at least one of the sequence of palette color values currently comprised by the color palette,
    increasing a rank of the palette color value of highest rank among the at least one of the sequence of palette color values currently comprised by the color palette by one; and
  coding into a data stream
    a color palette information on the color palette;
    an information associating each pixel with a respective palette color value of the color palette,
wherein the information associating each pixel with a respective palette color value of the color palette is coded by traversing the pixels of a predetermined region of the pixel array a second time with
  using the color palette as manifesting itself after the traversal of the pixels of the predetermined region along the scan order,
  associating each pixel with a corresponding one of the sequence of palette color values comprised by the color palette,
when said computer program is run by a computer.

26. A non-transitory digital storage medium having a computer program stored thereon to perform the method for encoding a pixel array by palette coding, comprising:
  traversing pixels of a predetermined region of the pixel array along a scan order,
  if the currently traversed pixel's color value does not fulfill a predetermined similarity criterion with respect to any of a sequence of palette color values currently comprised by the color palette,
updating the color palette by appending the currently traversed pixel's color value to an end of the sequence of palette color values, corresponding to a lowest rank of the color palette, and
if the currently traversed pixel's color value fulfills a predetermined similarity criterion with respect to at least one of the sequence of palette color values currently comprised by the color palette,
performing an adaptation of a rank order among the palette color values currently comprised by the color palette depending on with which of the sequence of palette color values currently comprised by the color palette the currently traversed pixel the currently traversed pixel's color value fulfills a predetermined similarity criterion;
coding into a data stream
a color palette information on the color palette;
an information associating each pixel with a respective palette color value of the color palette,
wherein the currently traversed pixel's color value fulfills the predetermined similarity criterion with respect to a predetermined palette color value among the sequence of palette color values currently comprised by the color palette if a difference between the currently traversed pixel's color value and the predetermined palette color value succeeds a predetermined threshold wherein the threshold depends on a rank of the predetermined palette color value within the sequence of palette color values,
when said computer program is run by a computer.

* * * * *